United States Patent
Seok

(10) Patent No.: US 9,887,821 B2
(45) Date of Patent: Feb. 6, 2018

(54) METHOD AND APPARATUS FOR TRANSMITTING AND RECEIVING FEEDBACK TRIGGER FRAMES IN WIRELESS LAN SYSTEMS

(71) Applicant: LG Electronics Inc., Seoul (KR)

(72) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 30 days.

(21) Appl. No.: 14/394,397

(22) PCT Filed: Apr. 15, 2013

(86) PCT No.: PCT/KR2013/003132
§ 371 (c)(1),
(2) Date: Oct. 14, 2014

(87) PCT Pub. No.: WO2013/157787
PCT Pub. Date: Oct. 24, 2013

(65) Prior Publication Data
US 2015/0085777 A1  Mar. 26, 2015

Related U.S. Application Data

(60) Provisional application No. 61/624,368, filed on Apr. 15, 2012, provisional application No. 61/642,415, (Continued)

(51) Int. Cl.
*H04L 5/00* (2006.01)
*H04L 1/16* (2006.01)
(Continued)

(52) U.S. Cl.
CPC .......... *H04L 5/0055* (2013.01); *H04L 1/1685* (2013.01); *H04W 52/0216* (2013.01);
(Continued)

(58) Field of Classification Search
CPC ....... H04L 1/14; H04L 1/1614; H04L 1/1628; H04L 1/1861; H04L 5/14; H04L 5/1423; H04L 5/16
(Continued)

(56) References Cited

U.S. PATENT DOCUMENTS 9,655,144 B2 * 5/2017 Seok ...................... H04W 74/04
9,706,537 B2 * 7/2017 Lee ........................ H04L 5/0055
(Continued)

FOREIGN PATENT DOCUMENTS

| CN | 101006684 A | 7/2007 |
|---|---|---|
| CN | 101361308 A | 2/2009 |

(Continued)

OTHER PUBLICATIONS

Yong Liu, Early-Ack-Indication, IEEE 802.11-12/0119r0, IEEE, Jan. 2012.

(Continued)

*Primary Examiner* — Warner Wong
(74) *Attorney, Agent, or Firm* — Dentons US LLP

(57) ABSTRACT

The present invention relates to a wireless communication system and, in particular, to a method and apparatus for transmitting/receiving a feedback trigger frame in a wireless LAN system. The method for transmitting a feedback trigger frame by means of a request station (STA) in a wireless communication system according to one embodiment of the present invention includes the steps of: transmitting the feedback trigger frame including an acknowledgement (ACK) indication field to a response STA; and receiving a feedback frame from the response STA, wherein the ACK indication field can be set as a value indicating a first type associated with ACK, a second type associated with block
(Continued)

ACK (BA), a third type associated with no ACK, or a fourth type associated with an ACK other than those of the first, second, and third types.

13 Claims, 17 Drawing Sheets

Related U.S. Application Data filed on May 3, 2012, provisional application No. 61/696,810, filed on Sep. 5, 2012.

(51) Int. Cl.
*H04W 52/02* (2009.01)
*H04W 84/12* (2009.01)

(52) U.S. Cl.
CPC ... *H04W 52/0219* (2013.01); *H04W 52/0229* (2013.01); *H04W 84/12* (2013.01); *Y02B 60/50* (2013.01)

(58) Field of Classification Search
USPC .................................................. 370/278, 282
See application file for complete search history.

(56) References Cited

U.S. PATENT DOCUMENTS

| | | | |
|---|---|---|---|
| 2006/0048034 A1* | 3/2006 | Cho | H04L 1/1614 714/749 |
| 2006/0165008 A1* | 7/2006 | Li | H04L 1/0019 370/252 |
| 2006/0248429 A1* | 11/2006 | Grandhi | H04L 1/1664 714/749 |
| 2007/0171933 A1* | 7/2007 | Sammour | H04W 74/0816 370/447 |
| 2007/0195811 A1 | 8/2007 | Basson et al. | |
| 2010/0202306 A1 | 8/2010 | Jersenius et al. | |
| 2011/0199946 A1 | 8/2011 | Breit et al. | |
| 2011/0305176 A1* | 12/2011 | Wentink | H04L 1/1607 370/310 |
| 2014/0233478 A1* | 8/2014 | Wentink | H04L 5/0055 370/329 |
| 2015/0071204 A1* | 3/2015 | Seok | H04B 7/0452 370/329 |
| 2017/0156112 A1* | 6/2017 | Seok | H04W 52/0216 |

FOREIGN PATENT DOCUMENTS

| | | |
|---|---|---|
| KR | 1020060018403 | 3/2006 |
| KR | 1020100080520 | 7/2010 |
| KR | 1020110095098 | 8/2011 |
| WO | 2006091809 A2 | 8/2006 |
| WO | 2010099491 A2 | 9/2010 |
| WO | 2011159831 A1 | 12/2011 |

OTHER PUBLICATIONS

Hongyuan Zhang (Marvell), 11ac Explicit Sounding and Feedback, IEEE 802.11-10/1105r0, Sep. 14, 2010.

Sudheer Grandhi, Considerations for early NAV indication, IEEE 802.11-12/0615r0, May 11, 2012.

Young Hoon Kwon, Response Frame Indication, IEEE 802.11-13/0296r0.

* cited by examiner

METHOD AND APPARATUS FOR TRANSMITTING AND RECEIVING FEEDBACK TRIGGER FRAMES IN WIRELESS LAN SYSTEMS

This application is a 35 USC §371 National Stage entry of International Application No. PCT/KR2013/003132 filed on Apr. 15, 2013, and claims priority to U.S. Provisional Application Nos. 61/624,368 filed on Apr. 15, 2012; 61/642,415 filed on May 3, 2012 and 61/696,810 filed Sep. 5, 2012, all of which are hereby incorporated by reference in their entireties as if fully set forth herein.

TECHNICAL FIELD

The present invention relates to a wireless communication system, and more particularly, to a method and apparatus for transmitting/receiving a feedback trigger frame in a wireless local area network (LAN) system.

BACKGROUND ART

Recently, with development of information communication technology, various wireless communication technologies have been developed. Among others, a wireless local area network (WLAN) enables wireless access to the Internet using a portable terminal such as a personal digital assistant (PDA), a laptop, a portable multimedia player (PMP) in a home, an enterprise or a specific service provision area based on radio frequency technology.

In order to overcome limitations in communication rate which have been pointed out as weakness of a WLAN, in recent technical standards, a system for increasing network speed and reliability and extending wireless network distance has been introduced. For example, in IEEE 802.11n, multiple input and multiple output (MIMO) technology using multiple antennas in a transmitter and a receiver has been introduced in order to support high throughput (HT) with a maximum data rate of 540 Mbps or more, to minimize transmission errors, and to optimize data rate.

DISCLOSURE

Technical Problem

As next-generation communication technology, machine-to-machine (M2M) communication technology has been discussed. Even in an IEEE 802.11 WLAN system, technical standards supporting M2M communication have been developed as IEEE 802.11ah. In M2M communication, a scenario in which a small amount of data is communicated at a low rate may be considered in an environment in which many apparatuses are present.

Communication in a WLAN system is performed in a medium shared between all apparatuses. As in M2M communication, when the number of apparatuses is increased, if a long period of time is taken for channel access of one device, overall system performance may be degraded and power saving of each device may be impeded.

An object of the present invention devised to solve the problem lies in a new method for configuration of a frame for triggering feedback, and a method for transmitting/receiving the feedback trigger frame.

It is to be understood that both the foregoing general description and the following detailed description of the present invention are exemplary and explanatory and are intended to provide further explanation of the invention as claimed.

Technical Solution

The object of the present invention can be achieved by providing a method for transmitting a feedback trigger frame in a request station (STA) of a wireless communication system, the method including transmitting the feedback trigger frame including an acknowledgement (ACK) indication field to a response STA, and receiving a feedback frame from the response STA, wherein the ACK indication field is set as a value indicating one of a first type associated with ACK, a second type associated with block ACK (BA), a third type associated with No ACK, or a fourth type associated with a type other than the first type, the second type, or the third type.

In another aspect of the present invention, provided herein is a method for transmitting a feedback frame in a response station (STA) of a wireless communication system, the method including receiving a feedback trigger frame including an acknowledgement (ACK) indication field from a request STA, and transmitting the feedback frame from the request STA, wherein the ACK indication field is set as a value indicating one of a first type associated with ACK, a second type associated with block ACK (BA), a third type associated with No ACK, or a fourth type associated with a type other than the first type, the second type, or the third type.

In another aspect of the present invention, provided herein is a request station (STA) apparatus for transmitting a feedback trigger frame in a wireless communication system, the STA apparatus, the STA apparatus including a transceiver and a processor, wherein the processor is configured to transmit the feedback trigger frame including an acknowledgement (ACK) indication field to a response STA using the transceiver and to receive the feedback frame from the response STA using the transceiver, and the ACK indication field is set as a value indicating one of a first type associated with ACK, a second type associated with block ACK (BA), a third type associated with No ACK, or a fourth type associated with a type other than the first type, the second type, or the third type.

In another aspect of the present invention, provided herein is a response station (STA) apparatus for transmitting a feedback frame of a wireless communication system, the STA apparatus including a transceiver and a processor, wherein the processor is configured to receive a feedback trigger frame including an acknowledgement (ACK) indication field from a request STA using the transceiver, and to transmit the feedback frame from the request STA using the transceiver, and the ACK indication field is set as a value indicating one of a first type associated with ACK, a second type associated with block ACK (BA), a third type associated with No ACK, or a fourth type associated with a type other than the first type, the second type, or the third type.

The embodiments of the present invention may have the following features.

The ACK indication field may indicate a type of a response frame transmitted in response to the feedback trigger frame.

The ACK indication field may be configured as a value indicating the fourth type when the response frame transmitted in response to the feedback trigger frame is the feedback frame.

The fourth type may indicate a response frame with a greater length than the second type or third type of response frame.

The ACK indication field may be defined in a bit size 2.

The ACK indication field may be included in a signal (SIG) field of the feedback trigger frame.

The ACK indication field may be used to determine a time length for defer of transmission of other STAs except for the request STA and the response STA.

The feedback trigger frame may be a null data packet (NDP) or Poll frame for sounding.

The feedback frame may include channel state information (CSI).

The response STA may be an STA that estimates a channel according to a sounding request by the request STA.

The request STA may be an AP and the response STA may be a non-AP STA.

The feedback trigger frame may be transmitted after a short inter-frame space (SIFS) interval after an NDP announcement (NDPA) frame is transmitted from the request STA to the response STA.

It is to be understood that both the foregoing general description and the following detailed description of the present invention are exemplary and explanatory and are intended to provide further explanation of the invention as claimed.

Advantageous Effects

The present invention may provide a new method for configuring a frame for triggering feedback, and a method and apparatus for transmitting/receiving the feedback trigger frame.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
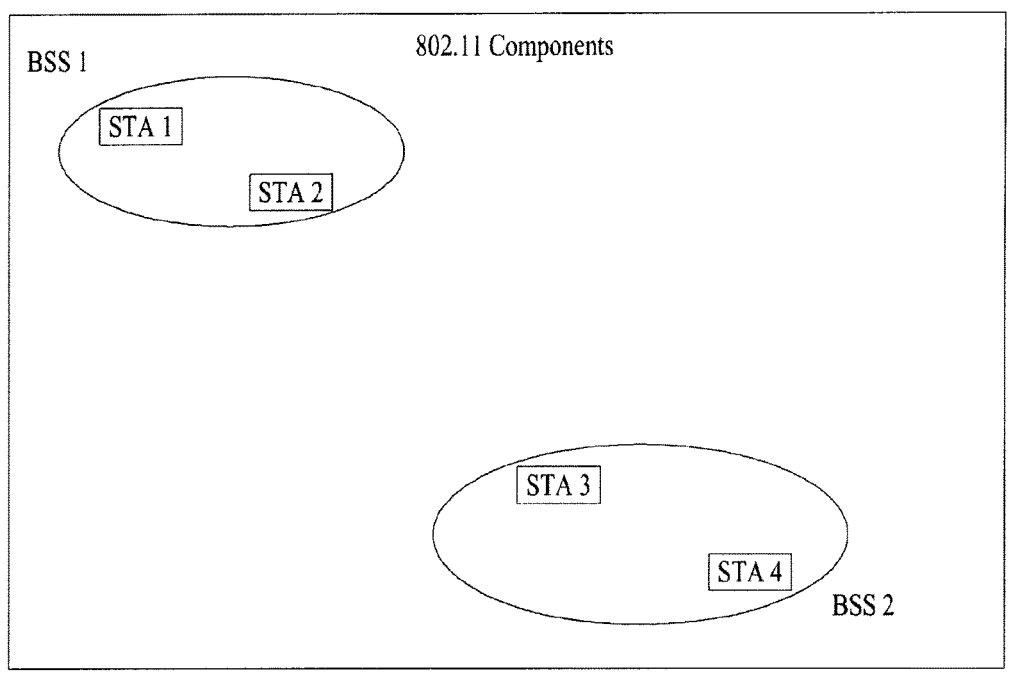
FIG. 1 is a diagram showing an exemplary structure of an IEEE 802.11 system to which the present invention is applicable.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
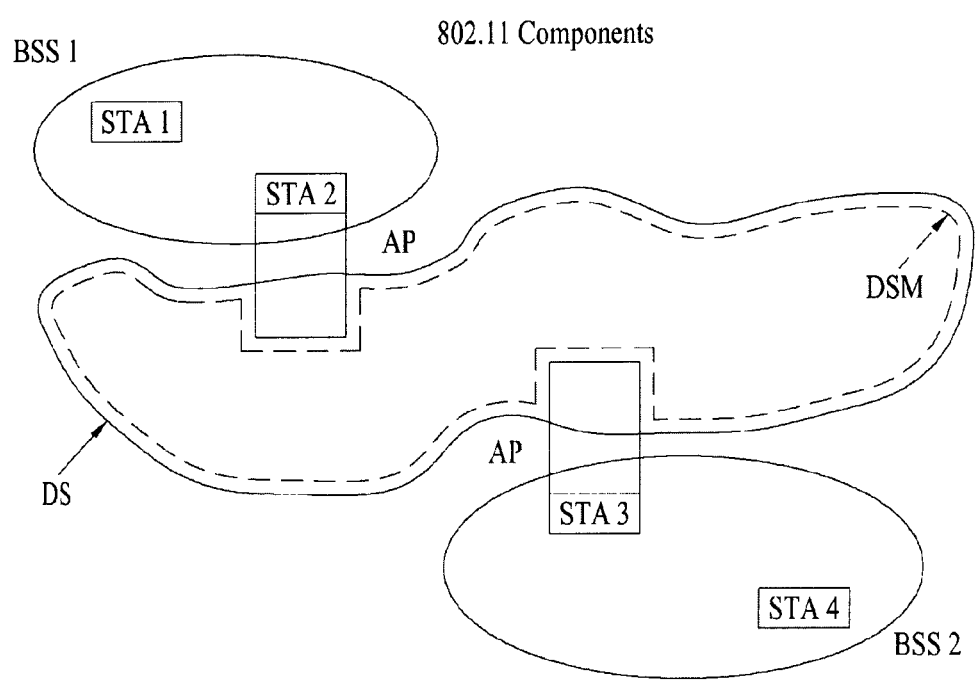
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
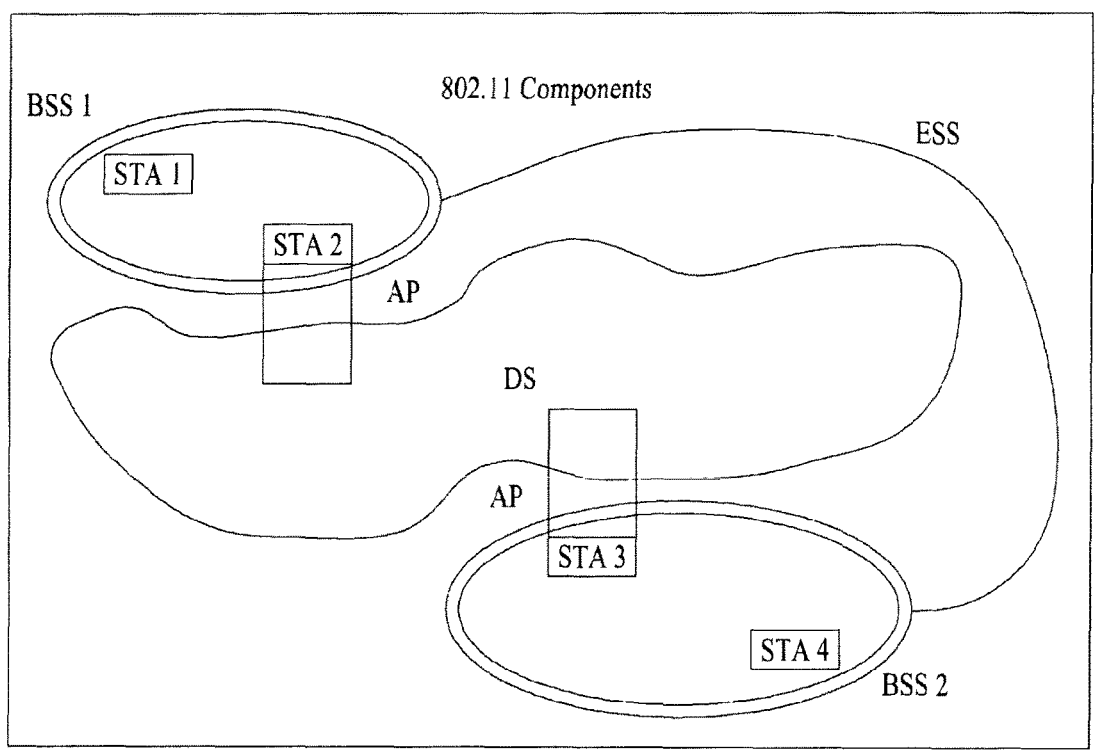
FIG. 3 is a diagram showing another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
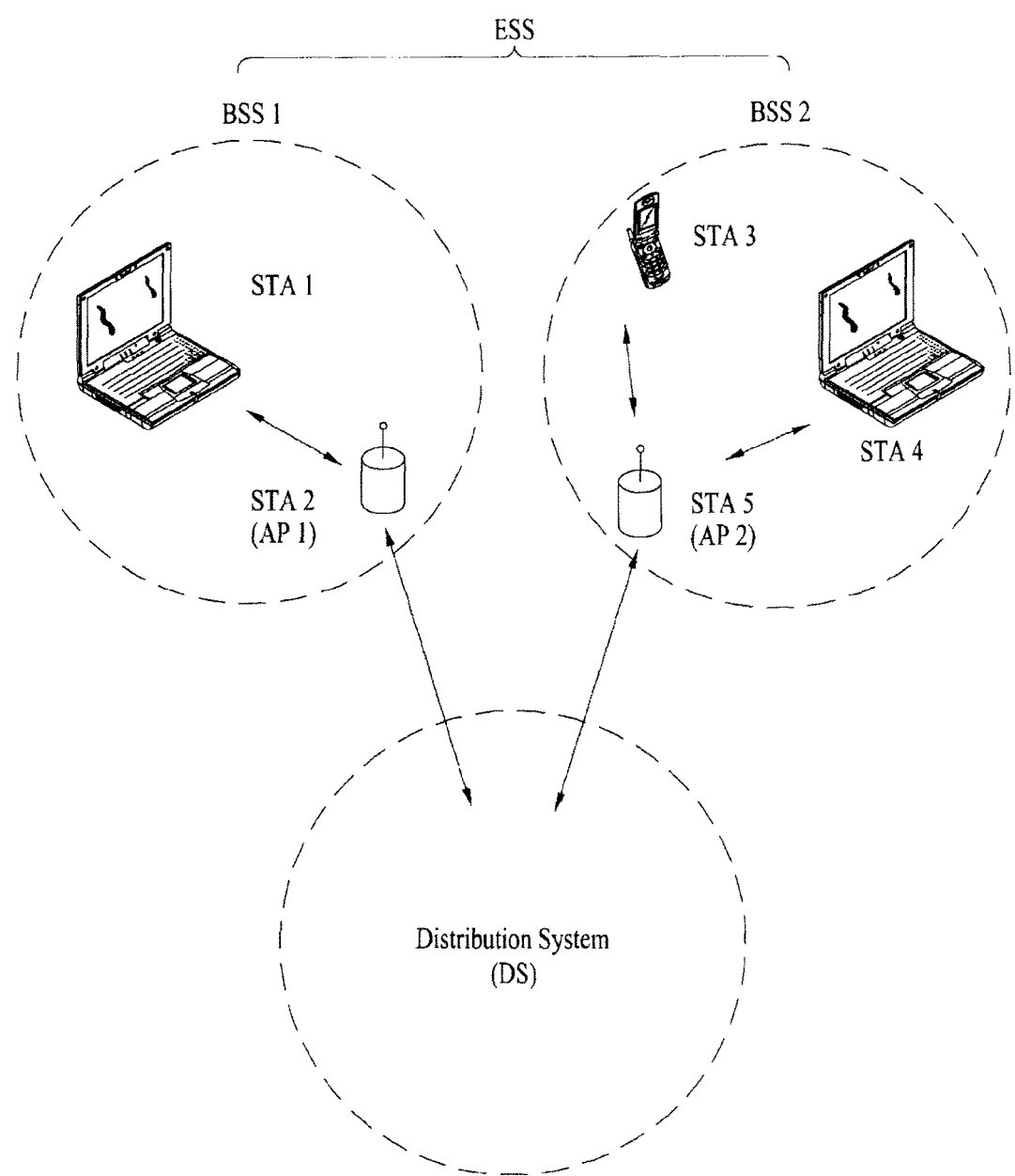
FIG. 4 is a diagram showing an exemplary structure of a wireless local area network (WLAN) system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Link Setup Process

Figure 5:
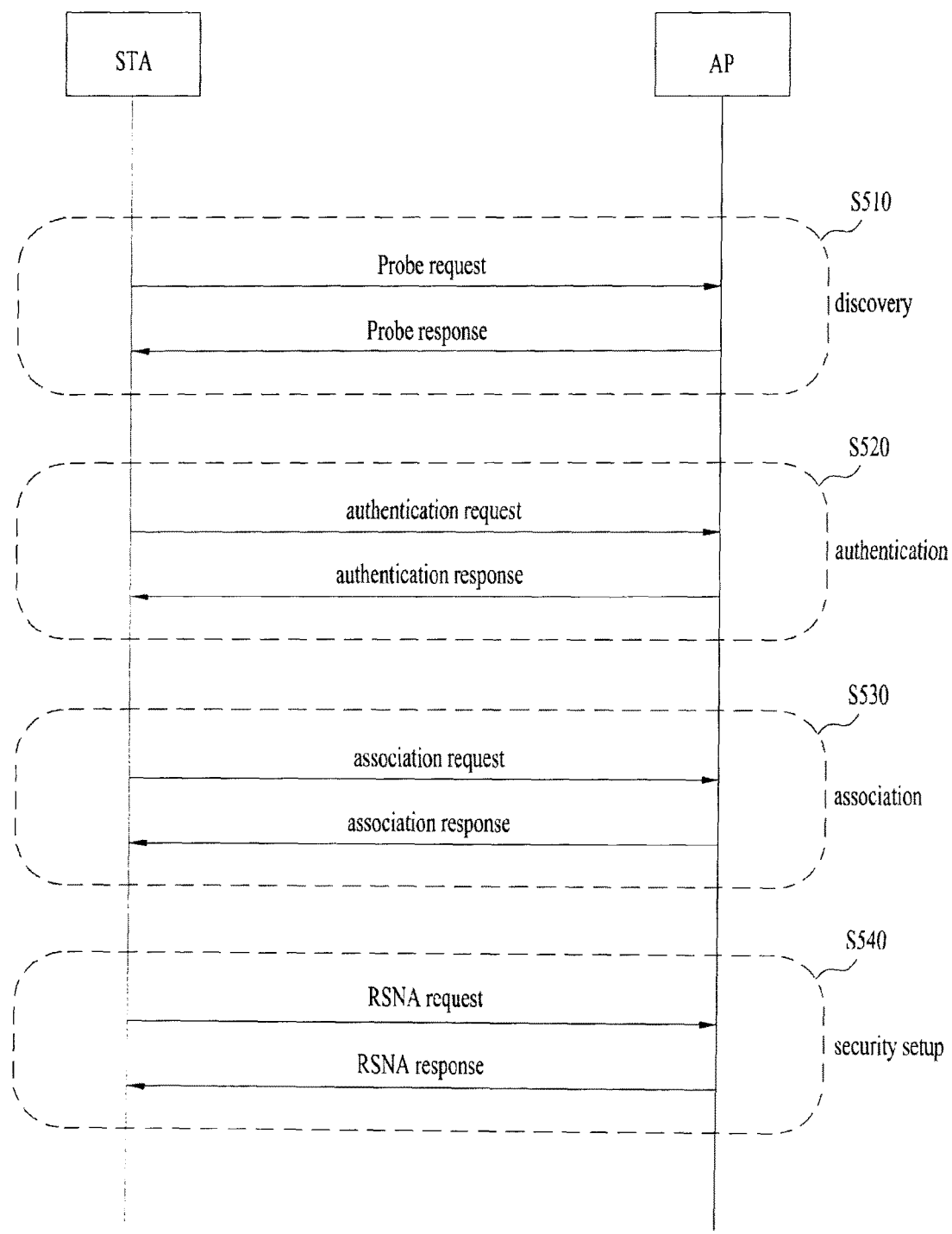
FIG. 5 is a diagram illustrating a link setup process in a WLAN system.

FIG. 5 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an (Extensible Authentication Protocol over LAN (EAPOL) frame. In addition, the security setup process may also be carried out according to other security schemes not defined in IEEE 802.11 standards.

WLAN Evolution

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

With the widespread use of WLAN technology and diversification of WLAN applications, there is a need to develop a new WLAN system capable of supporting a HT higher than a data processing speed supported by IEEE 802.11n. The next generation WLAN system for supporting Very High Throughput (VHT) is the next version (for example, IEEE 802.11ac) of the IEEE 802.11n WLAN system, and is one of IEEE 802.11 WLAN systems recently proposed to support a data process speed of 1 Gbps or more at a MAC SAP (Medium Access Control Service Access Point).

In order to efficiently utilize a radio frequency (RF) channel, the next generation WLAN system supports MU-MIMO (Multi User Multiple Input Multiple Output) transmission in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace has recently been discussed. For example, a technology for introducing the WLAN system in whitespace (TV WS) such as an idle frequency band (for example, 54~698 MHz band) left because of the transition to digital TV has been discussed under the IEEE 802.11af standard. However, the above-mentioned information is disclosed for illustrative purposes only, and the whitespace may be a licensed band capable of being primarily used only by a licensed user. The licensed user may be a user who has authority to use the licensed band, and may also be referred to as a licensed device, a primary user, an incumbent user, or the like.

For example, an AP and/or STA operating in the whitespace (WS) must provide a function for protecting the licensed user. For example, assuming that the licensed user such as a microphone has already used a specific WS channel acting as a divided frequency band on regulation in a manner that a specific bandwidth is occupied from the WS band, the AP and/or STA cannot use the frequency band corresponding to the corresponding WS channel so as to protect the licensed user. In addition, the AP and/or STA must stop using the corresponding frequency band under the condition that the licensed user uses a frequency band used for transmission and/or reception of a current frame.

Therefore, the AP and/or STA must determine whether to use a specific frequency band of the WS band. In other words, the AP and/or STA must determine the presence or absence of an incumbent user or a licensed user in the frequency band. The scheme for determining the presence or absence of the incumbent user in a specific frequency band is referred to as a spectrum sensing scheme. An energy detection scheme, a signature detection scheme and the like may be used as the spectrum sensing mechanism. The AP and/or STA may determine that the frequency band is being used by an incumbent user if the intensity of a received signal exceeds a predetermined value, or when a DTV preamble is detected.

M2M (Machine to Machine) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc. As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). In addition, the STA operates according to a command received via downlink (i.e., a link from the AP to the non-AP STA) in M2M communication, such that data is reported through uplink (i.e., a link from the non-AP STA to the AP). M2M communication is mainly focused upon the communication scheme improved on uplink for transmission of the principal data. In addition, an M2M STA is mainly operated as a battery and the user may feel difficulty in frequently charging the M2M STA with electricity, such that battery consumption is minimized, resulting in an increased battery lifetime. In addition, the user may have difficulty in directly handling the M2M STA in a specific situation, such that a self-recovery function is needed. Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period, and at the same time can reduce power consumption of the STA.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

WLAN Operating in Sub-1 GHz

As described above, the IEEE 802.11ah standard using M2M communication as a use case has been discussed. According to the IEEE 802.11ah standard, a WLAN may operate in an unlicensed band except for a TV white space band in an operation frequency of sub-1 GHz and have an extraordinarily wide coverage (e.g., maximum of 1 km) compared with a WLAN that mainly supports legacy indoor coverage. That is, unlike a legacy WLAN that operates in a frequency of 2.4 GHz or 5 GHz, when a WLAN is used in an operation frequency band of sub-1 GHz (e.g., 700 to 900 MHz), coverage of an AP is extended about two to three times based on the same transmission power due to propagation characteristics of a corresponding band. In this case, the IEEE 802.11ah standard has characteristics whereby a very large number of STAs per AP can be accessed. Use cases considered in the IEEE 802.11ah standard may be summarized as shown in Table 1 below.

TABLE 1

Use Case 1: Sensors and meters

1a: Smart Grid - Meter to Pole
1c: Environmental/Agricultural Monitoring
1d: Industrial process sensors
1e: Healthcare
1f: Healthcare
1g: Home/Building Automation
1h: Home sensors TABLE 1-continued Use Case 2: Backhaul Sensor and meter data Backhaul aggregation of sensors
Backhaul aggregation of industrial sensors
Use Case 3: Extended range Wi-Fi Outdoor extended range hotspot
Outdoor Wi-Fi for cellular traffic offloading According to Use Case 1 of Table 1 above, various types of sensor/meter apparatuses can access an 802.11ah AP and perform M2M communication. In particular, in the case of smart grid, a maximum of 6,000 sensor/meter apparatuses can access one AP.

According to Use Case 2 of Table 1 above, an 802.11ah AP providing wide coverage functions as a backhaul link of another system such as IEEE 802.15.4 g.

According to Use Case 3 of Table 1 above, outdoor extended range hotspot communication such as extended home coverage, campus wide coverage, and shopping malls can be supported. In addition, according to Use Case 3, an 802.11ah AP can support traffic offloading of cellular mobile communication to distribute overload of cellular traffic.

A physical layer PHY configuration for communication in sub-1 GHz can be embodied by 1/10 down-clocking a legacy IEEE 802.11ac PHY. In this case, a channel bandwidth of 20/40/80/160/80+80 MHz in 802.11ac, 1/10 can provide a channel bandwidth of 2/4/8/16/8+8 MHz in a sub-1 GHz band via down-clocking. Thus a guard interval (GI) is increased 10 times to 8 μs from 0.8 μs. Table 2 below compares 802.11ac PHY and throughput of 1/10 down-clocked sub-1 GHz PHY.

TABLE 2

| IEEE 802.11ac PHY Channel Bandwidth/Throughput | 1/10 down-clocked sub-1 GHz PHY Channel Bandwidth/Throughput |
| --- | --- |
| 20 MHz/86.7 Mbps | 2 MHz/8.67 Mbps |
| 40 MHz/200 Mbps | 4 MHz/20 Mbps |
| 80 MHz/433.3 Mbps | 8 MHz/43.33 Mbps |
| 160 MHz/866.7 Mbps | 16 MHz/86.67 Mbps |
| 80 + 80 MHz/866.6 Mbps | 8 + 8 MHz/86.66 Mbps |

Medium Access Mechanism

In the IEEE 802.11-based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random back-off period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
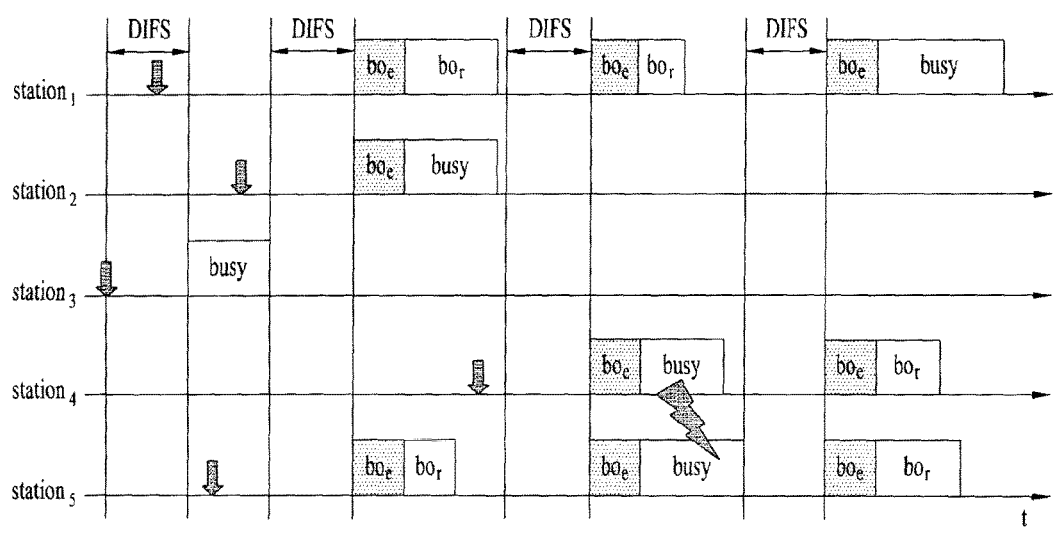
FIG. 6 is a diagram illustrating a backoff process.

FIG. 6 is a conceptual diagram illustrating a backoff process.

Operations based on a random backoff period will hereinafter be described with reference to FIG. 6. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting.

That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 6 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value may prohibit or defer medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 7:
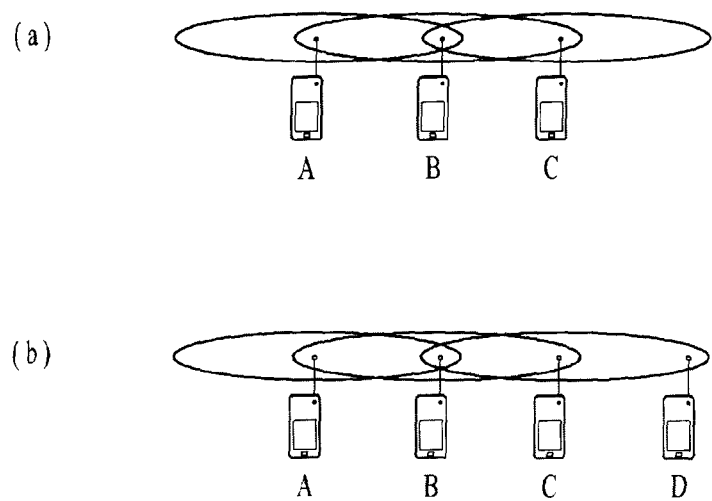
FIG. 7 is a diagram illustrating a hidden node and an exposed node.

FIG. 7 is a conceptual diagram illustrating a hidden node and an exposed node.

FIG. 7(a) exemplarily shows the hidden node. In FIG. 7(a), STA A communicates with STA B, and STA C has information to be transmitted. In FIG. 7(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(b) exemplarily shows an exposed node. In FIG. 7(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 8:
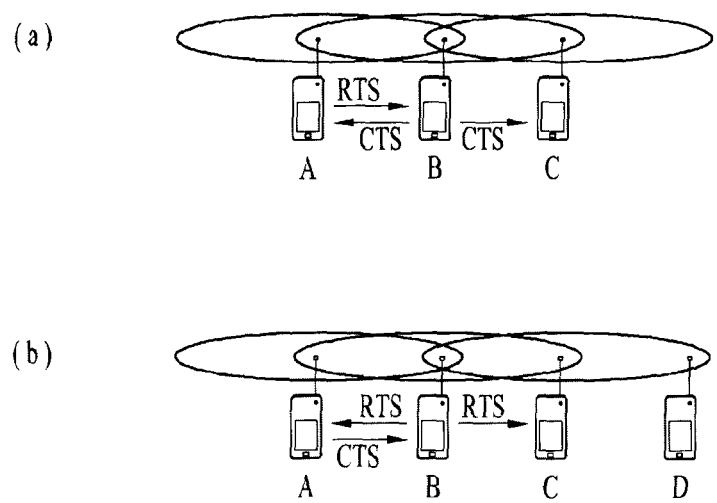
FIG. 8 is a diagram illustrating request to send (RTS) and clear to send (CTS)

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheard by peripheral STA(s), such that the peripheral STA(s) may consider whether information is communicated between the two STAs. For example, if STA is used for data transmission transmits the RTS frame to the STA having received data, the STA having received data transmits the CTS frame to peripheral STAs, and may inform the peripheral STAs that the STA is going to receive data.

FIG. 8(a) exemplarily shows the method for solving problems of the hidden node. In FIG. 8(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the reception (Rx) state and the transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a power management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like.

On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

Figure 9:
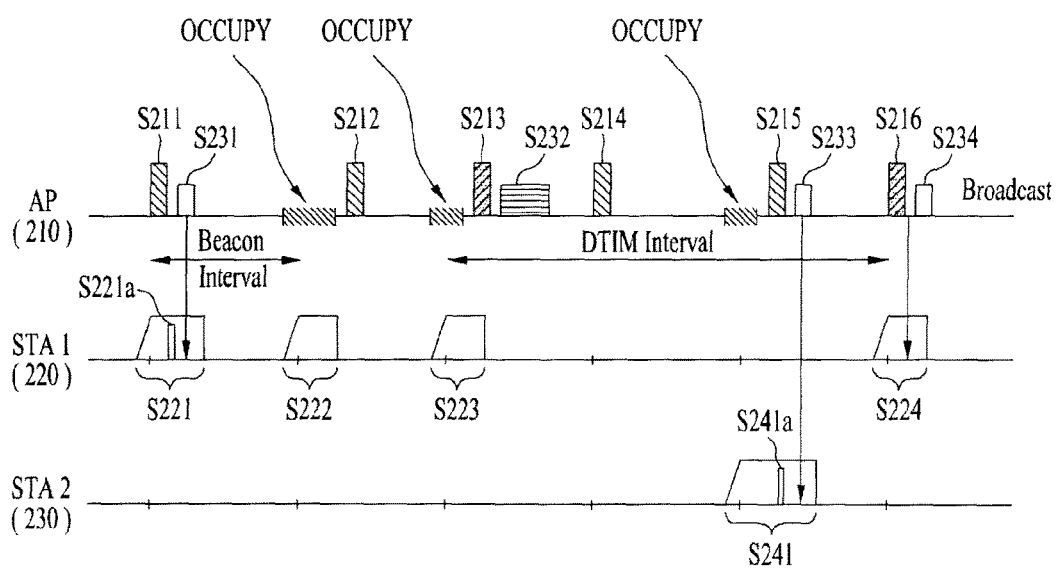
FIG. 9 is a diagram illustrating power management operation.

FIG. 9 is a conceptual diagram illustrating a power management (PM) operation.

Referring to FIG. 9, AP 210 transmits a beacon frame to STAs present in the BSS at intervals of a predetermined time period in steps (S211, S212, S213, S214, S215, S216). The beacon frame includes a TIM information element. The TIM information element includes buffered traffic regarding STAs associated with the AP 210, and includes specific information indicating that a frame is to be transmitted. The TIM information element includes a TIM for indicating a unicast frame and a Delivery Traffic Indication Map (DTIM) for indicating a multicast or broadcast frame.

AP 210 may transmit a DTIM once whenever the beacon frame is transmitted three times. Each of STA1 220 and STA2 222 is operated in the PS mode. Each of STA1 220 and STA2 222 is switched from the sleep state to the awake state every wakeup interval, such that STA1 220 and STA2 222 may be configured to receive the TIM information element transmitted by the AP 210. Each STA may calculate a switching start time at which each STA may start switching to the awake state on the basis of its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state in step S221 when AP 210 first transmits the beacon frame in step S211. STA1 220 receives the beacon frame, and obtains the TIM information element. If the obtained TIM element indicates the presence of a frame to be transmitted to STA1 220, STA1 220 may transmit a Power Save-Poll (PS-Poll) frame, which requests the AP 210 to transmit the frame, to the AP 210 in step S221a. The AP 210 may transmit the frame to STA1 220 in response to the PS-Poll frame in step S231. STA1 220 having received the frame is re-switched to the sleep state, and operates in the sleep state.

When AP 210 secondly transmits the beacon frame, a busy medium state in which the medium is accessed by another device is obtained, the AP 210 may not transmit the beacon frame at an accurate beacon interval and may transmit the beacon frame at a delayed time in step S212. In this case, although STA1 220 is switched to the awake state in response to the beacon interval, it does not receive the delay-transmitted beacon frame so that it re-enters the sleep state in step S222.

When AP 210 thirdly transmits the beacon frame, the corresponding beacon frame may include a TIM element denoted by DTIM. However, since the busy medium state is given, AP 210 transmits the beacon frame at a delayed time in step S213. STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 and there is a frame for another STA. In this case, STA1 220 confirms the absence of a frame to be received in the STA1 220, and re-enters the sleep state, such that the STA1 220 may operate in the sleep state. After the AP 210 transmits the beacon frame, the AP 210 transmits the frame to the corresponding STA in step S232.

AP 210 fourthly transmits the beacon frame in step S214. However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, that has been switched to receive a TIM element every beacon interval, may be switched to another operation state in which STA1 220 can awake from the sleep state once every three beacon intervals. Therefore, when AP 210 transmits a fourth beacon frame in step S214 and transmits a fifth beacon frame in step S215, STA1 220 maintains the sleep state such that it cannot obtain the corresponding TIM element.

When AP 210 sixthly transmits the beacon frame in step S216, STA1 220 is switched to the awake state and operates in the awake state, such that the STA1 220 is unable to obtain the TIM element contained in the beacon frame in step S224. The TIM element is a DTIM indicating the presence of a broadcast frame, such that STA1 220 does not transmit the PS-Poll frame to the AP 210 and may receive a broadcast frame transmitted by the AP 210 in step S234. In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element in step S241. STA2 230 recognizes the presence of a frame to be transmitted to the STA2 230 through the TIM element, and transmits the PS-Poll frame to the AP 210 so as to request frame transmission in step S241a. AP 210 may transmit the frame to STA2 230 in response to the PS-Poll frame in step S233.

In order to operate/manage the power save (PS) mode shown in FIG. 9, the TIM element may include either a TIM indicating the presence or absence of a frame to be transmitted to the STA, or a DTIM indicating the presence or absence of a broadcast/multicast frame. DTIM may be implemented through field setting of the TIM element.

Figure 10:
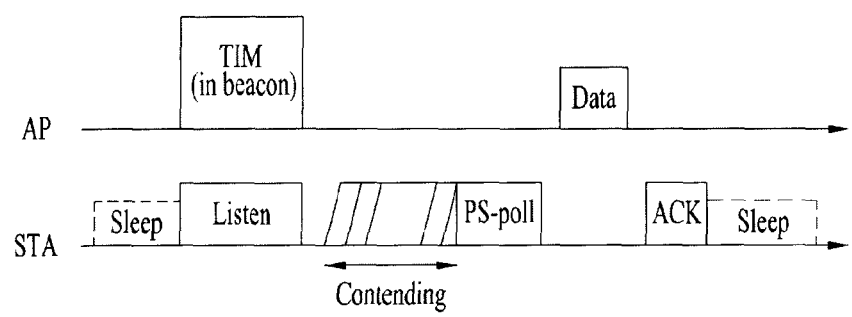
FIGS. 10 to 12 are diagram illustrating operation of a station (STA) which receives a TIM.
Figure 11:
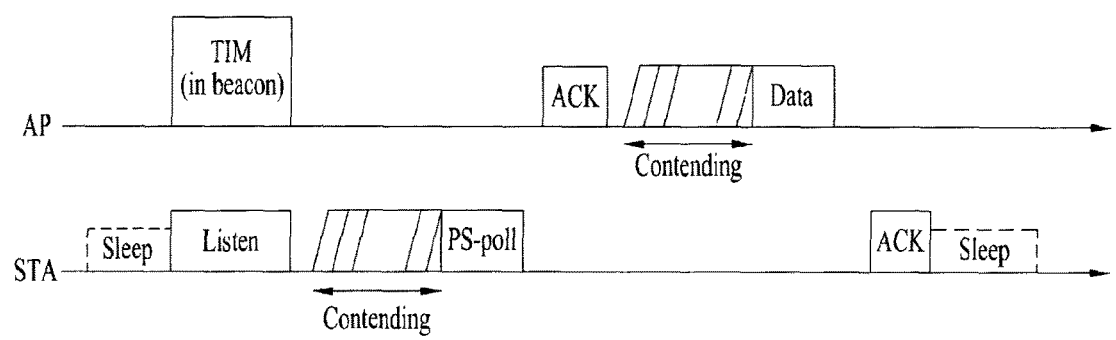
Figure 12:
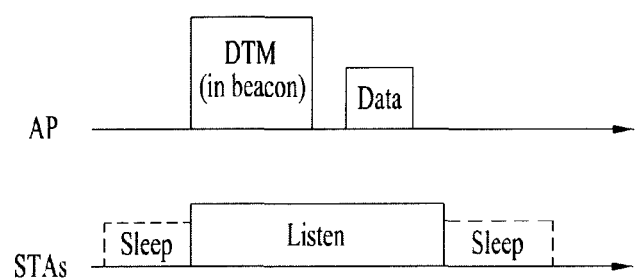

FIGS. 10 to 12 are conceptual diagrams illustrating detailed operations of the STA having received a Traffic Indication Map (TIM).

Referring to FIG. 10, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 10, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 11.

The STA operations of FIG. 11 in which the STA is switched from the sleep state to the awake state, receives a TIM from the AP, and transmits the PS-Poll frame to the AP through contention are identical to those of FIG. 10. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 12 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

TIM Structure

In the operation and management method of the Power save (PS) mode based on the TIM (or DTIM) protocol shown in FIGS. 9 to 12, STAs may determine the presence or absence of a data frame to be transmitted for the STAs through STA identification information contained in the TIM element. STA identification information may be specific information associated with an Association Identifier (AID) to be allocated when an STA is associated with an AP.

AID is used as a unique ID of each STA within one BSS. For example, AID for use in the current WLAN system may be allocated to one of 1 to 2007. In the case of the current WLAN system, 14 bits for AID may be allocated to a frame transmitted by AP and/or STA. Although the AID value may be assigned a maximum of 16383, the values of 2008~16383 are set to reserved values.

The TIM element according to legacy definition is inappropriate for application of M2M application through which many STAs (for example, at least 2007 STAs) are associated with one AP. If the conventional TIM structure is extended without any change, the TIM bitmap size excessively increases, such that it is impossible to support the extended TIM structure using the legacy frame format, and the extended TIM structure is inappropriate for M2M communication in which application of a low transfer rate is considered. In addition, it is expected that there are a very small number of STAs each having an Rx data frame during one beacon period. Therefore, according to exemplary application of the above-mentioned M2M communication, it is expected that the TIM bitmap size is increased and most bits are set to zero (0), such that there is needed a technology capable of efficiently compressing such bitmap.

In the legacy bitmap compression technology, successive values (each of which is set to zero) of 0 are omitted from a head part of bitmap, and the omitted result may be defined as an offset (or start point) value. However, although STAs each including the buffered frame is small in number, if there is a high difference between AID values of respective STAs, compression efficiency is not high. For example, assuming that the frame to be transmitted to only a first STA having an AID of 10 and a second STA having an AID of 2000 is buffered, the length of a compressed bitmap is set to 1990, the remaining parts other than both edge parts are assigned zero (0). If STAs associated with one AP is small in number, inefficiency of bitmap compression does not cause serious problems. However, if the number of STAs associated with one AP increases, such inefficiency may deteriorate overall system throughput.

Figure 13:
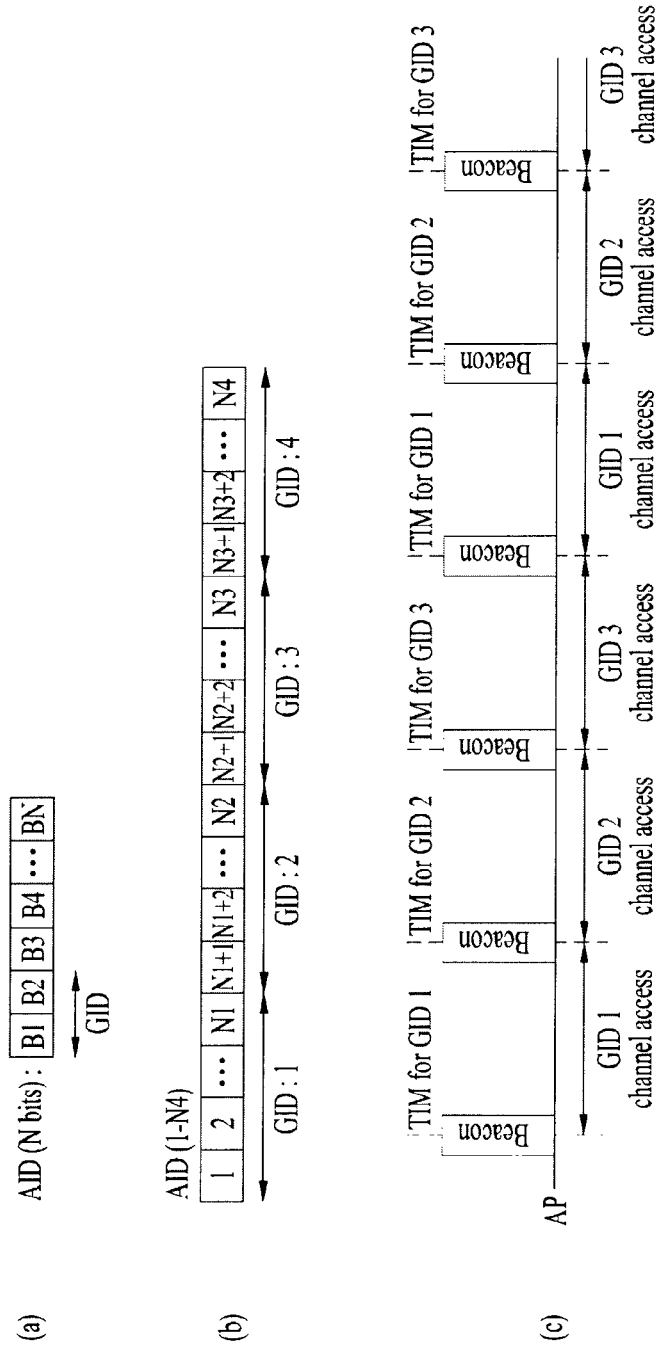
FIG. 13 is a diagram illustrating a group based association ID (AID)

In order to solve the above-mentioned problems, AIDs are divided into a plurality of groups such that data can be more efficiently transmitted using the AIDs. A designated group ID (GID) is allocated to each group. AIDs allocated on the basis of such group will hereinafter be described with reference to FIG. 13.

FIG. 13(a) is a conceptual diagram illustrating a group-based AID. In FIG. 13(a), some bits located at the front part of the AID bitmap may be used to indicate a group ID (GID). For example, it is possible to designate four GIDs using the first two bits of an AID bitmap. If a total length of the AID bitmap is denoted by N bits, the first two bits (B1 and B2) may represent a GID of the corresponding AID.

FIG. 13(b) is a conceptual diagram illustrating a group-based AID. In FIG. 13(b), a GID may be allocated according to the position of AID. In this case, AIDs having the same GID may be represented by offset and length values. For example, if GID 1 is denoted by Offset A and Length B, this means that AIDs (A~A+B−1) on bitmap are respectively set to GID 1. For example, FIG. 13(b) assumes that AIDs (1~N4) are divided into four groups. In this case, AIDs contained in GID 1 are denoted by 1~N1, and the AIDs contained in this group may be represented by Offset 1 and Length N1. AIDs contained in GID 2 may be represented by Offset (N1+1) and Length (N2−N1+1), AIDs contained in GID 3 may be represented by Offset (N2+1) and Length (N3−N2+1), and AIDs contained in GID 4 may be represented by Offset (N3+1) and Length (N4−N3+1).

In case of using the aforementioned group-based AIDs, channel accessg is allowed in a different time interval according to individual GIDs, the problem caused by the insufficient number of TIM elements compared with a large number of STAs can be solved and at the same time data can be efficiently transmitted/received. For example, during a specific time interval, channel access is allowed only for STA(s) corresponding to a specific group, and channel access to the remaining STA(s) may be restricted. A predetermined time interval in which access to only specific STA(s) is allowed may also be referred to as a Restricted Access Window (RAW).

Channel access based on GID will hereinafter be described with reference to FIG. 13(c). If AIDs are divided into three groups, the channel access mechanism according to the beacon interval is exemplarily shown in FIG. 13(c). A first beacon interval (or a first RAW) is a specific interval in which channel access to an STA corresponding to an AID contained in GID 1 is allowed, and channel access of STAs contained in other GIDs is disallowed. For implementation of the above-mentioned structure, a TIM element used only for AIDs corresponding to GID 1 is contained in a first beacon frame. A TIM element used only for AIDs corresponding to GID 2 is contained in a second beacon frame. Accordingly, only channel access to an STA corresponding to the AID contained in GID 2 is allowed during a second beacon interval (or a second RAW) during a second beacon interval (or a second RAW). A TIM element used only for AIDs having GID 3 is contained in a third beacon frame, such that channel access to an STA corresponding to the AID contained in GID 3 is allowed using a third beacon interval (or a third RAW). A TIM element used only for AIDs each having GID 1 is contained in a fourth beacon frame, such that channel access to an STA corresponding to the AID contained in GID 1 is allowed using a fourth beacon interval (or a fourth RAW). Thereafter, only channel access to an STA corresponding to a specific group indicated by the TIM contained in the corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is periodical or cyclical according to the beacon interval, the scope or spirit of the present invention is not limited thereto. That is, only AID(s) contained in specific GID(s) may be contained in a TIM element, such that channel access to STA(s) corresponding to the specific AID(s) is allowed during a specific time interval (for example, a specific RAW), and channel access to the remaining STA(s) is disallowed.

The aforementioned group-based AID allocation scheme may also be referred to as a hierarchical structure of a TIM. That is, a total AID space is divided into a plurality of blocks, and channel access to STA(s) (i.e., STA(s) of a specific group) corresponding to a specific block having any one of the remaining values other than '0' may be allowed. Therefore, a large-sized TIM is divided into small-sized blocks/groups, STA can easily maintain TIM information, and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of AID bitmap may represent a page ID (i.e., PID), the next N2 bits may represent a block ID, the next N3 bits may represent a sub-block ID, and the remaining bits may represent the position of STA bits contained in a sub-block.

In the examples of the present invention, various schemes for dividing STAs (or AIDs allocated to respective STAs) into predetermined hierarchical group units, and managing the divided result may be applied to the embodiments, however, the group-based AID allocation scheme is not limited to the above examples.

PPDU Frame Format

A Physical Layer Convergence Protocol (PLCP) Packet Data Unit (PPDU) frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG fields) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU defined in the MAC layer, and may include data generated/used in a higher layer. A PPDU TAIL bit may allow the encoder to return to a state of zero (0). The padding bit may be used to adjust the length of a data field according to a predetermined unit.

MAC PDU may be defined according to various MAC frame formats, and the basic MAC frame is composed of a MAC header, a frame body, and a Frame Check Sequence. The MAC frame is composed of MAC PDUs, such that it can be transmitted/received through PSDU of a data part of the PPDU frame format.

On the other hand, a null-data packet (NDP) frame format may indicate a frame format having no data packet. That is, the NDP frame includes a PLCP header part (i.e., STF, LTF, and SIG fields) of a general PPDU format, whereas it does not include the remaining parts (i.e., the data field). The NDP frame may be referred to as a short frame format.

Improved NDP Sounding Procedure

The present invention proposes a new NDP sounding procedure obtained by improving a legacy NDP sounding procedure. The new NDP sounding procedure proposed according to the present invention can be applied to, for example, a WLAN system that operates in a sub-1 GHZ band (e.g., 902 MHz to 928 MHz).

Figure 14:
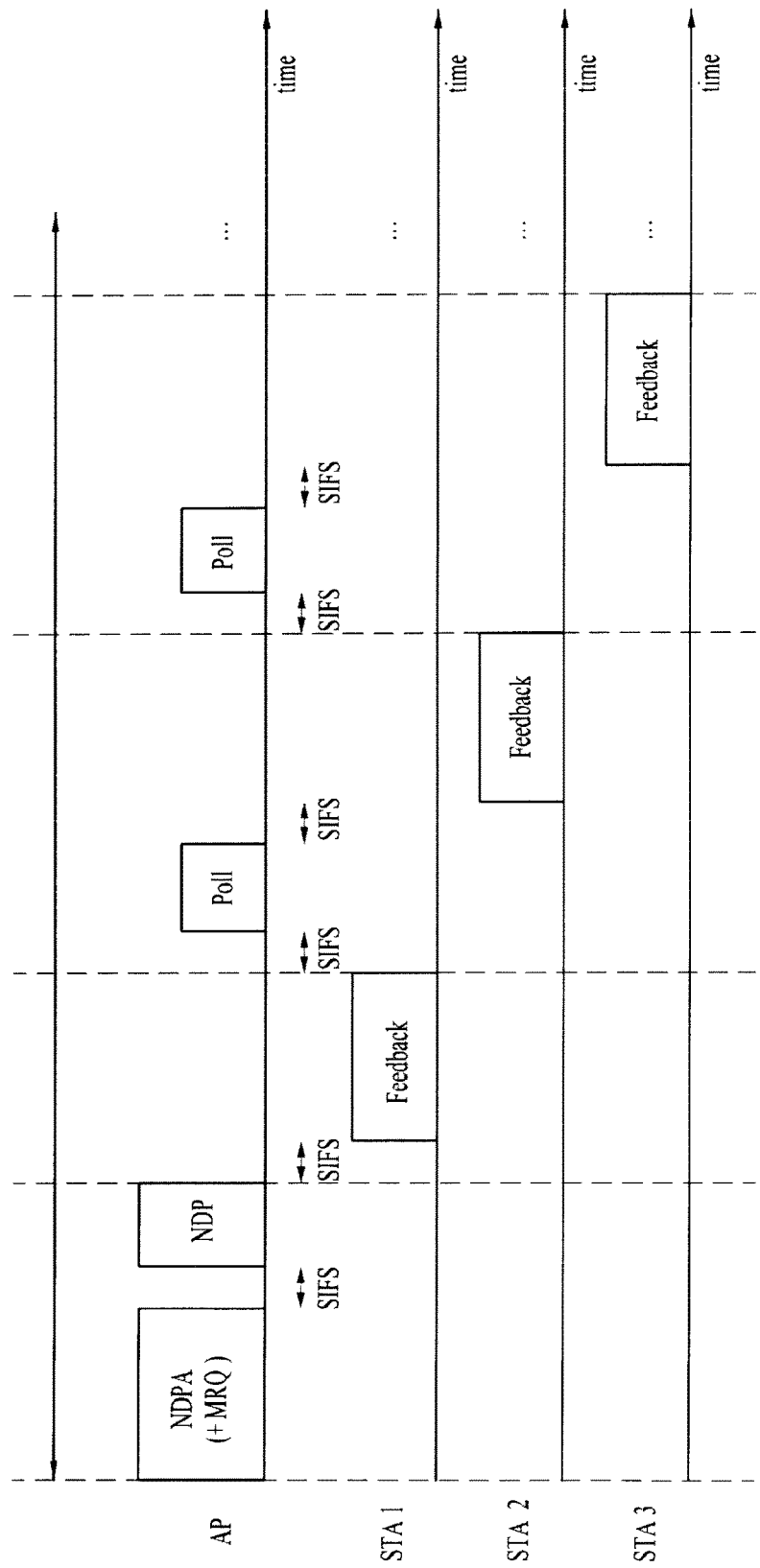
FIG. 14 is a diagram for explanation of an NDP sounding procedure.

FIG. 14 is a diagram for explanation of an NDP sounding procedure.

A sounding protocol is a procedure for acquiring feedback information of channel state information (CSI) between an AP and an STA from the STA for beamforming transmission to the STA by the AP. The beamforming transmission refers to a transmission scheme for controlling a beam direction with respect to each STA and can be used for a multiuser (MU)-MIMO transmission, etc. In addition, the CSI may contain a modulation and coding scheme (MCS) to be determined to be appropriate for a corresponding channel.

Through the sounding procedure, the AP may transmit an NDP frame (i.e., a PPDU frame with a PSDU length of 0) and the STA may calculate/estimate CSI based on the NDP frame and transmit the result (i.e., feedback information) to the AP. The CSI calculated/estimated through the NDP frame may be fed back to the AP that requests sounding through a compressed beamforming report frame, for example. In addition, the NDP frame transmitted by the AP may be received by a plurality of STAs and the AP may acquire feedback information from each STA.

Prior to the NDP frame transmitted by the AP, an NDP announcement (NDPA) frame may be transmitted. The NDPA frame may be a PPDU frame indicating that the NDP frame is followed. A first STA of an STA list contained in the NDPA frame may immediately transmit a feedback frame to the AP without separate polling from the AP.

The NDPA frame is a control frame (e.g., a high throughput control (HTC) frame), an NDP announcement subfield of which is configured as 1. In addition, the NDPA frame needs to be transmitted to be received by target STAs of a sounding procedure. Thus beamforming should not be applied to transmission of the NDPA frame (i.e., data needs to be omni-directionally transmitted).

Referring to FIG. 14, an AP may transmit an NDPA frame and transmit an NDP frame after an SIFS interval. The NDPA frame may include a MCS request (MRQ) subfield. When the MRQ subfield of the NDPA frame transmitted by the AP is configured as 1, an STA that receives the NDPA frame can recognize that the AP requests MCS feedback.

A first STA (e.g., STA1) of an STA list included in the NDPA may receive an NDP from an AP and transmit feedback information after an SIFS interval. The AP may receive the feedback information from STA1 and transmit a Poll frame to STA2 after an SIFS interval. In addition, STA2 that receives the Poll frame from the AP may transmit feedback information to the AP after an SIFS interval. Then STAs poled by the AP may sequentially transmit feedback information to the AP.

As seen from FIG. 14, the NDP frame and Poll frame that are transmitted by the STA (i.e., the AP) that requests feedback during the sounding procedure are common in that both the NDP frame and the Poll frame are each a frame for triggering a feedback frame from a target STA (i.e., STA1, STA2, STA3) of the sounding procedure, and thus, the NDP frame and the Poll frame can also be collectively referred to as a feedback trigger frame.

Structure of NDPA Frame

Figure 15:
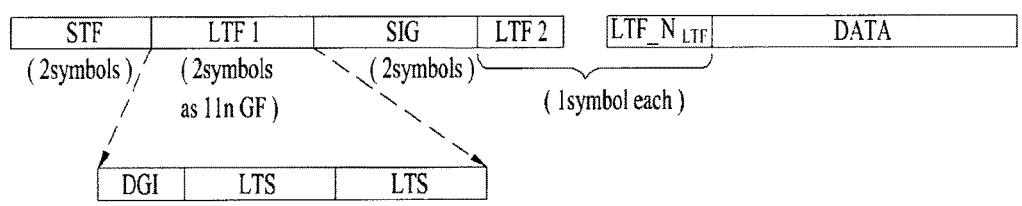
FIG. 15 is a diagram for explanation of the exemplary format of an NDPA frame.

FIG. 15 is a diagram for explanation of the exemplary format of an NDPA frame.

In the NDPA frame structure, bit allocation of an SIG field may be configured as shown in Table 3 below.

TABLE 3

| | |
|---|---|
| Length/Duration | 9 bits |
| MCS | 4 bits |
| BW | 2 bits |
| Aggregation | 1 bit |
| STBC | 1 bit |
| Coding | 2 bits |
| Short GI | 1 bits |
| Nsts | 2 bits |
| PAID | 9 bits |
| ACK indication | 2 bits |

TABLE 3-continued

| | |
|---|---|
| Reserved | 5 bits |
| CRC | 4 bits |
| Tail | 6 bits |
| Total = 48 | |

As shown in Table 3 above, total bits of the SIG field of the NDPA frame may include 48 bits.

A length/duration field indicates an OFDM symbol (i.e., duration) or byte number (i.e., length) of a corresponding frame. When an aggregation field of a single-user (SU) frame is 1, the length/duration field is interpreted as a duration field. When the aggregation field is 0, the length/duration field is interpreted as a length field. Since a multiple-user (MU) frame is configured in such a way that the aggregation field is not defined and aggregation is always applied, the length/duration field is interpreted as a duration field. In addition, with regard to a mandate aggregate MAC PDU (AMPDU), a packet size of which exceeds 511 bytes, the length/duration field is interpreted as a duration field.

An MCS field indicates a modulation and coding scheme used for PSDU transmission of a corresponding frame. Upon receiving a frame including the MCS field, other STAs may calculate duration of a currently received frame based on a value of the MCS field and a length value of the length/duration field (e.g., in the case of SU frame with an aggregation field of 0).

A BW field indicates a channel bandwidth of a corresponding frame. For example, the BW field may be configured in such a way that, when a value of the BW field is 0, the BW field indicates a bandwidth of 2 MHz, when a value of the BW field is 1, the BW field indicates a bandwidth of 4 MHz, when a value of the BW field is 2, the BW field indicates a bandwidth of 8 MHz, and when a value of the BW field is 3, the BW field indicates a bandwidth of 16 MHz/8+8 MHz.

An aggregation field indicates whether a PSDU of a corresponding frame is aggregated in the form of AMPDU. When the aggregation field is 1, this means that the PSDU is aggregated and transmitted in the form of AMPDU. When the aggregation field is 0, this means that that PSDU is not aggregated and is transmitted.

A space time block coding (STBC) field indicates whether STBC (e.g., an Alamouti code) is applied to a corresponding frame.

A coding field indicates a coding scheme used in a corresponding frame. For example, 1 bit of 2 bits of the coding field may indicate whether a binary convolutional code (BCC) or low density parity check (LDPC) scheme is used, and the remaining 1 bit may indicate an additional symbol during a low density parity check (LDPC) encoding procedure.

A space-time stream number (Nsts) field refers to the number of space streams of a corresponding frame. A maximum of 4 space streams can be transmitted. Thus in order to represent this, the Nsts is defined in a bit size 2.

A partial AID (PAID) field indicates an ID for identifying an STA that needs to receive a frame. For example, a value of the PAID in an uplink frame may be configured based on a BSSID and a value of the PAID in a downlink frame may be configured based on an AID of the STA.

An ACK indication field may be configured as a value indicating a type of a response frame to a corresponding frame. For example, the ACK indication field may be configured in such a way that, when the ACK indication field is 00, the ACK indication field indicates normal ACK, when the ACK indication field is 01, the ACK indication field indicates a block ACK (BA), and when the ACK indication field is 10, the ACK indication field indicates No ACK. A value of 11 may be reserved.

In addition, the SIG field may include a CRC field and a tail bit and the remaining bits may be defined as a reserved field.

Referring back to FIG. 15, a MAC payload (i.e., a data field of FIG. 15) of the NDPA frame may include information about target STA(s) of the sounding procedure. For example, in the NDPA frame structure, bit allocation of the MAC payload may be configured as shown in Table 4 below.

TABLE 4

| | |
|---|---|
| AID | 13 bits |
| Feedback Type | 1 bits |
| Nc Index | 2 bits |
| . . . | |

Three fields (i.e., an AID field, a Feedback Type field, and an Nc Index field) shown in Table 4 above are associated with one target STA of the sounding procedure. Like in the example of FIG. 14, when the NDPA frame is targeted at a plurality of STAs, information about the target STA may be configured in such a way that AID, feedback type, and Nc index fields are repeated, and aggregation of the three fields indicates information about a separate STA.

The AID field shown in Table 4 above includes an AID of an STA that is expected to process an NDP frame subsequent to the NDPA and to prepare sounding feedback.

A feedback type field indicates a type of requested feedback. For example, the feedback type field may be configured in such a way that, when the feedback type field is 0, an SU type of feedback is indicated and when the feedback type field is 1, an MU type of feedback is indicated.

When the feedback type field indicates Mu, an Nc index field indicates the number of columns of a compressed beamforming matrix. For example, when the Nc index field is 0, 1, 2, . . . , 7, the feedback type field may be configured in such a way that the number of requested columns indicates 1, 2, 3, . . . , 8, respectively. When the feedback type field indicates SU, the Nc index field is reserved.

Configuration of SIG Field of Feedback Trigger Frame

Figure 16:
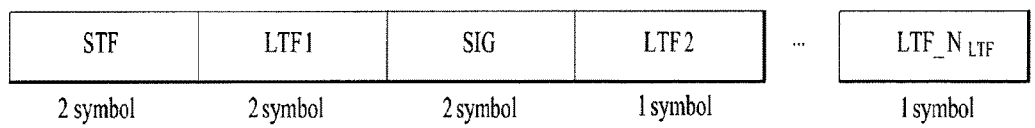
FIG. 16 is a diagram for explanation of the exemplary format of a feedback trigger frame.

FIG. 16 is a diagram for explanation of the exemplary format of a feedback trigger frame.

As described with regard to the example of FIG. 14, the feedback trigger frame refers to a frame (e.g., an NDP frame and a Poll frame) for triggering transmission of a feedback frame from a target STA. Hereinafter, for convenience of description, the NDP frame will be description as a representative example of the feedback trigger frame. However, a scope of the present invention is not limited thereto and other feedback trigger frames are configured in the frame format that will be described below.

As described, like in the case in which beamforming is not applied to transmission of the NDPA frame, the NDP frame needs to also be received by target STAs and used for calculation of CSI during a sounding procedure, and thus beamforming should not be applied to transmission of the NDP transmission (i.e., data needs to be omni-directionally transmitted).

Bit allocation of an SIG field in the NDP frame may be configured as shown in Table 5 below.

TABLE 5

| | |
|---|---|
| MCS | 4 bits |
| BW | 2 bits |
| Nsts | 2 bits |
| PAID | 9 bits |
| ACK indication | 2 bits |
| Reserved | 19 bits |
| CRC | 4 bits |
| Tail | 6 bits |
| Total = 48 | |

As shown in Table 5 above, total bits of the SIG field of the NDPA frame may include 48 bits.

An MCS field of Table 5 above indicates an index of a modulation and coding scheme used for PSDU transmission of a corresponding frame. Since the MCS field is defined in a bit size 4, the MCS field may be configured as one of 0 to 15. Here, a scope of values of the MCS field in a normal PPDU frame and NDP frame may be differently configured. That is, the normal PPDU and the NDP can be differentiated from each other using the MCS field. For example, an MCS field of the normal PPDU may have one of 0 to 10 in order to represent an MCS index of the PSDU. An MCS field of the NDP may have one of 11 to 15 in order to represent an NDP type. In particular, in the case of an NDP frame for sounding, a value of the MCS field may be configured as 11 in order to represent this. In short, Table 6 below is shown.

TABLE 6

| MCS field value | indication |
|---|---|
| 0-10 | MCS index for normal PPDU |
| 11 | NDP for sounding |
| 12-15 | NDP |

In Table 5 above, a BW field indicates a channel bandwidth for requesting sounding and may be configured as the same value as a value of the channel bandwidth value of the NDPA. For example, the BW field may be configured in such a way that, when a value of the BW field is 0, the BW field indicates a bandwidth of 2 MHz, when a value of the BW field is 1, the BW field indicates a bandwidth of 4 MHz, when a value of the BW field is 2, the BW field indicates a bandwidth of 8 MHz, and when a value of the BW field is 3, the BW field indicates a bandwidth of 16 MHz/8+8 MHz.

In Table 5 above, an Nsts field refers to the number of training sequences (i.e., the number of space streams) that are transmitted to a target STA for sounding. A value of the Nsts field may be used to determine the number of LTF fields (i.e., LTF2, . . . , LTE_$N_{LTF}$) that are transmitted after an SIG field.

A PAID field in Table 5 above may be configured as 0 when a plurality of target STAs is used in a sounding procedure. When one target STA is used in the sounding procedure, a value of the PAID field may be configured as a value (e.g., a value obtained by applying a hashing function to an AID of a target STA) determined based on AID of a corresponding target STA.

An ACK indication field in Table 5 above indicates a type of a response frame transmitted after an NDP frame.

There may be a third STA (i.e., a third party STA) except for an STA (e.g., an AP of FIG. 14) that requests NDP sounding and an STA (e.g., STA1, STA2, and STA3 of FIG. 14) that transmits feedback in response to the NDP sounding. Even if the third party STA can receive an NDPA frame and an NDP frame from the AP, there may be a hidden environment in which a feedback frame transmitted by a target STA of a sounding procedure cannot be received. In this case, the third party STA may not recognize that the target STA of the sounding procedure transmits the feedback frame, may determine that a channel is not occupied for a corresponding period of time, and may perform transmission. In this case, the feedback frame transmitted by the target STA of the sounding procedure and a frame transmitted by the third party STA may collide with each other, and an AP that requests the NDP sounding may not receive a feedback frame from a target STA of the sounding procedure.

In the present invention, the ACK indication field included in the NDP frame is used to represent a type of a response frame (i.e., a feedback frame) to the NDP frame. Since a size of the feedback frame transmitted by the target STA in the sounding procedure may be greater than a normal ACK or BA frame, configuration of the ACK indication field indicating one of three cases of legacy ACK, BA, and No ACK needs to be corrected such that the ACK indication field indicates another type of response (e.g., a feedback frame transmitted by the target STA of the sounding procedure).

As such, by explicitly indicating a type of the response frame through the NDPA or NDP frame, hidden nodes (i.e., third party STAs) may recognize that a channel (or a medium) is occupied during a length of a corresponding response frame and operate to defer transmission. Thus it is advantageous that collision of transmission of a feedback frame between the target STA and the third party STA can be prevented. To this end, the ACK indication field (or a response type field) may be configured as shown in Table 7 below.

TABLE 7

| ACK indication (Response Type) field value | indication |
|---|---|
| 00 | Ack |
| 01 | BA |
| 10 | No Acks |
| 11 | a frame not ACK, BA, . . . |

As shown in Table 7 above, other STAs that can hear an NDP frame transmitted by an AP as well as a target STA of the NDP frame can recognize a type of response frame transmitted after the NDP field from a value of the ACK indication field (or a response type field) in an SIG field of the NDP frame. For example, when a value of an ACK indication field (or a response type field) in the SIG field in the NDP frame is 11, a different length of response frame, not an ACK frame and a BA frame is transmitted after the NDP frame. The different length (or a greater length than the ACK frame or the BA frame) of response frame may be a compressed beamforming report frame. That is, when a value of the ACK indication field (or a response type field) in the SIG field in the NDP frame is 11, the NDP frame is received and then the different length of response frame is transmitted after the SIFS interval.

Configuration of the ACK indication field (or a response type field) shown in Table 7 above may be purely exemplary. That is, the ACK indication field (or a response type field) in the SIG field of a feedback trigger frame (e.g., an NDP frame or a Poll frame) proposed according to the present invention may be configured as a value indicating one of four cases of a case in which a response frame length is 0 (i.e., No ACK), a case in which the response frame length is a normal length (i.e., Normal ACK), a case in which the response frame length is a length of a block ACK frame (i.e., a BA frame), and a case in which the response frame length is another length that is not a length of the normal ACK frame or a block ACK frame or more (e.g., compressed beamforming report frame).

In addition, the SIG field of the NDP frame may include bits of a CRC field and a tail field and the remaining bit may be defined as a reserved field.

The description of the NDP frame format (in particular, the structure of the SIG field of the NDP frame) of the NDP frame of the present invention described with reference to FIG. 16 and Tables 5 to 7 above can also be applied to a feedback trigger frame other than the NDP frame. For example, the above description can also be applied to a Poll frame transmitted by an AP in order to request feedback to target STAs (e.g., STA2 and STA3) of the sounding procedure in FIG. 14.

For example, the Poll frame may be defined as a frame in the form that does not include a PSDU. In addition, the structure of the Poll frame may be defined to include only STF, LTF, and SIG fields without a data portion similarly to the structure of the NDP frame of FIG. 16.

In addition, the ACK indication (or response type) field of the SIG field of the Poll frame may indicate a type of a frame to be transmitted in response to the Poll frame. In the example of the sounding procedure of FIG. 14, a feedback frame transmitted after the Poll frame may be a different type of feedback frame (e.g., a compressed beamforming report frame), not an ACK frame or a BA frame. In this case, a value of the response type field of the Poll frame may be configured as 11 (refer to Table 7). That is, the value of the response type field of the SIG field of the Poll frame transmitted by the AP may be interpreted as if a feedback frame (e.g., the compressed beamforming report frame) is requested by a target STA according to the Poll frame. Accordingly, even if third party STAs that cannot hear a feedback frame from the target STA are present, the third party STAs can hear the Poll frame from the AP and recognize that the feedback frame (e.g., the compressed beamforming report frame) will be transmitted after the Poll frame is transmitted. Accordingly the third party STA can operate to defer transmission during transmission of the feedback frame of the target STA, thereby avoiding collision.

An additional example of the SIG of the feedback trigger frame (e.g., an NDP frame or Poll frame for sounding) according to the present invention will be described with reference to Table 8 below.

TABLE 8

| | |
|---|---|
| MCS | 4 bits |
| Length/Duration | 9 bits |
| BW | 2 bits |
| Nsts | 2 bits |
| PAID | 9 bits |
| ACK indication | 2 bits |
| Reserved | 10 bits |
| CRC | 4 bits |
| Tail | 6 bits |
| Total = 48 | |

As shown in Table 8 above, total bits of an SIG field of a feedback trigger frame may include 48 bits. As compared with the configuration of the SIG field of Table 5 above, a length/duration field may be additionally defined for the configuration of the SIG field of Table 8 above.

An MCS field of Table 8 above indicates an index of a modulation and coding scheme used for PSDU transmission of a corresponding frame. Since the MCS field is defined in a bit size 4, the MCS field may be configured as one of 0 to 15. Here, a scope of values of an MCS field in a normal PPDU frame and a frame (e.g., a feedback trigger frame) for sounding may be differently configured. That is, the normal PPDU and the NDP can be differentiated from each other using the MCS field. For example, an MCS field of the normal PPDU may have one of 0 to 10 in order to represent an MCS index of the PSDU. In the case of an NDP frame for sounding, a value of the MCS field may be configured as a value of one of 10 to 15 in order to represent this. That is, the NDP frame and the normal frame cannot be differentiated from only a value of the MCS field, all values of the MCS field correspond to a normal frame, and some values (e.g., 11 to 15) of the values may indicate that a corresponding frame is a frame for sounding.

A length/duration field of Table 8 above may be configured as a value indicating the length/duration of a corresponding frame. In this case, in the example of the present invention, a value of the length/duration field of a feedback trigger frame (e.g., an NDP frame for sounding) may be configured as 0. Accordingly, whether a corresponding frame is an NDP frame may be indicated through the length/duration field.

Whether a corresponding frame is an NDP frame (or a feedback trigger frame) for sounding may be indicated through aggregation of the MCS field and the length/duration field. That is, when a value of the MCS field is configured as one of 11 to 15 and simultaneously a value of the length/duration field is configured as 0, this is indicated that a corresponding frame is an NDP frame (or a feedback trigger frame) for sounding.

A BW field, a Nsts field, a PAID field, a response field, a CRC field, a TAIL field, and a reserved field of Table 8 above are defined in the same way as in Table 5 above, and thus, a repeated description is not given here.

Additional examples of an SIG field of a feedback trigger frame (e.g., an NDP frame or a Poll frame for sounding) will be described with reference to Table. 9 below.

TABLE 9

| | |
|---|---|
| MCS | 4 bits |
| Length/Duration | 9 bits |
| BW | 2 bits |
| Nsts | 2 bits |
| PAID | 9 bits |
| ACK indication | 2 bits |
| Reserved | 10 bits |
| CRC | 4 bits |
| Tail | 6 bits |
| Total = 48 | |

As shown in Table 9 above, total bits of the SIG field of the feedback trigger frame may include 48 bits. As compared with the configuration of the SIG field of Table 5 above, a length/duration field may be additionally defined for the configuration of the SIG field of Table 9 above.

An MCS field of Table 9 above is defined in the same way as the MCS field of Table 5 above. That is, as summarized in Table 6 above, an MCS field of a normal PPDU may have one of 0 to 10, an MCS field of an NDP frame (or a feedback trigger frame) for sounding may have a value of 11, and the NDP frame may have a value of one of 12 to 15.

A length/duration field of Table 9 above indicates length/duration of a corresponding frame. In the case of the NDP frame (e.g., when a value of the MCS field is 11 to 15), a value of the length/duration field is configured as 0.

According to the SIG field configuration method, any one of the MCS field and the length/duration field may indicate whether a corresponding frame is an NDP frame (or a feedback trigger frame) for sounding. In this case, according to a method for embodying an STA, one or more of the MCS field and the length/duration field may be optionally used to indicate that a corresponding frame is an NDP frame (or a feedback trigger frame) for sounding.

A BW field, a Nsts field, a PAID field, a response field, a CRC field, a TAIL field, and a reserved field of Table 9 above are defined in the same way as in Table 5 above, and thus, a repeated description is not given here.

Figure 17:
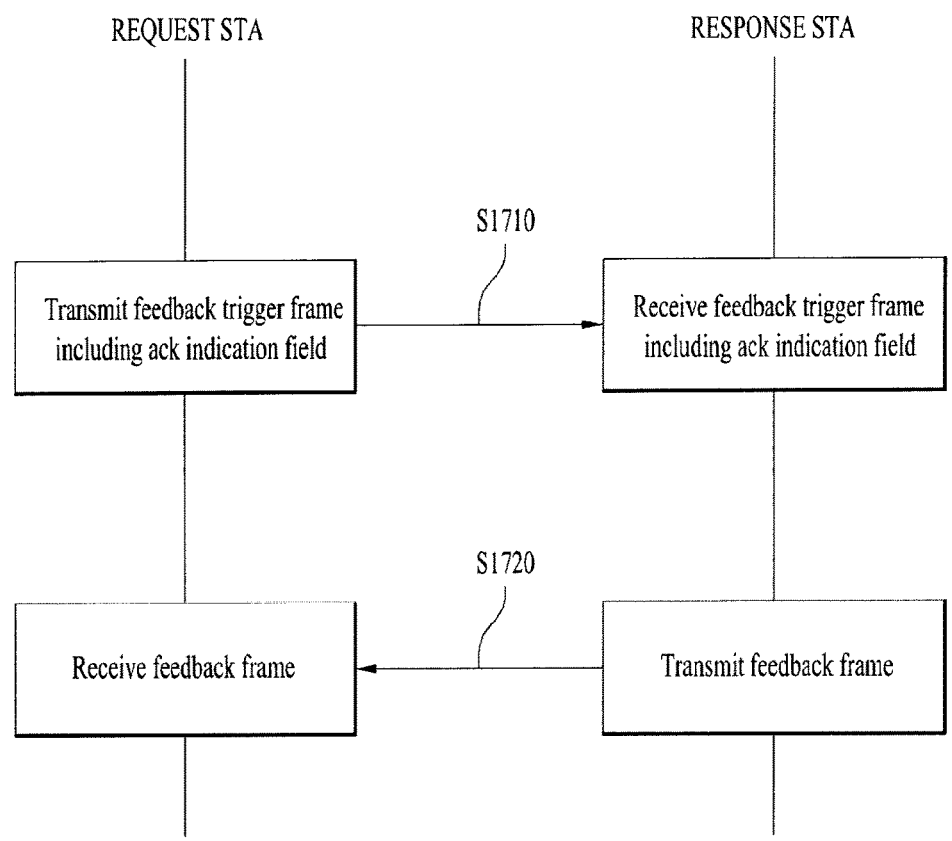
FIG. 17 is a flowchart for explanation of a method for transmitting and receiving a feedback trigger frame and a feedback frame according to an example of the present invention.

FIG. 17 is a flowchart for explanation of a method for transmitting and receiving a feedback trigger frame and a feedback frame according to an example of the present invention.

In step S1710, a request STA may transmit a feedback trigger frame including an ACK indication field to a response STA. The feedback trigger frame may be an NDP frame or a Poll frame and the ACK indication field may be included in an SIG field of a PLCP header of the feedback trigger frame. Prior to step S1710, an NDPA frame may be transmitted.

In step S1720, the request STA may receive a feedback frame from the response STA. The feedback frame may include channel state information.

In step S1710, the response STA may receive the feedback trigger frame including the ACK indication field from the request STA. The response STA that receives the feedback trigger frame may estimate a channel according to a sounding procedure. Accordingly, in step S1720, the response STA may contain, in the feedback frame, the channel estimation result and transmit the feedback frame to the request STA.

Here, the ACK indication field may be configured according to various embodiments proposed by the present invention. For example, when a feedback frame including channel state information needs to be transmitted from the response STA in response to the feedback trigger frame, the ACK indication field may be configured as a value indicating a different type of response frame (e.g., a response frame with a greater length than an ACK or BA frame), not the ACK and BA frames.

With regard to the method for configuring the feedback trigger frame/feedback frame of the present invention of FIG. 17, details described in the above embodiments of the present invention may be independently applied or two or more embodiments may be simultaneously applied.

Figure 18:
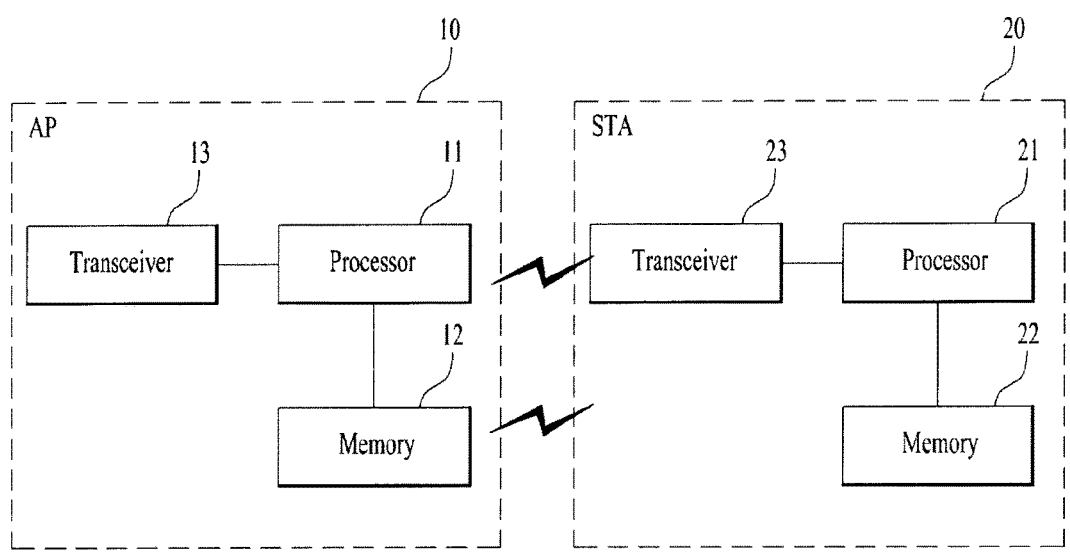
FIG. 18 is a block diagram showing the configuration of a wireless apparatus according to one embodiment of the present invention.

FIG. 18 is a block diagram showing the configuration of a wireless apparatus according to one embodiment of the present invention.

An AP may include a processor 11, a memory 12 and a transceiver 13. An STA 20 may include a processor 21, a memory 22 and a transceiver 23. The transceivers 13 and 23 may transmit/receive a radio frequency (RF) signal and implement a physical layer according to an IEEE 802 system, for example. The processors 11 and 21 may be respectively connected to the transceivers 13 and 21 to implement a physical layer and/or an MAC layer according to the IEEE 802 system. The processors 11 and 21 may be configured to perform operation according to the above-described various embodiments of the present invention. In addition, modules implementing operations of the AP and the STA according to the above-described embodiments of the present invention may be stored in the memories 12 and 22 and may be executed by the processors 11 and 21, respectively. The memories 12 and 22 may be mounted inside or outside the processors 11 and 21 to be connected to the processors 11 and 21 by known means, respectively.

The detailed configuration of the AP and the STA can be implemented such that the above-described embodiments of the present invention are independently applied or two or more embodiments are simultaneously applied and descriptions of redundant parts are omitted for clarity.

The embodiments of the present invention may be achieved by various means, for example, hardware, firmware, software, or a combination thereof.

In a hardware configuration, the methods according to the embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described embodiments of the present invention focus on IEEE 802.11, they are applicable to various mobile communication systems in the same manner.

The invention claimed is:

1. A method for receiving a feedback trigger frame by a response station (STA) of a wireless communication system, the method comprising:
   receiving, from a request STA, the feedback trigger frame comprising a first field; and
   transmitting a response frame in response to the feedback trigger frame;
   wherein the first field indicates a response type of the response frame,
   wherein transmission of the response frame is deferred when the first field indicates a long response, and
   wherein the first field has a bit size of 2 and a first value of the first field corresponds to the response type of the long response, and the first value of the first field is a value of '11'.

2. The method according to claim 1, wherein the first field is an ACK indication field.

3. The method according to claim 1, wherein the response type includes one of a response type associated with ACK, a response type associated with block ACK(BA), a response type associated with No response, or a response type associated with the long response,
   wherein the first field is set to a value among a plurality of values, wherein each of the plurality of values indicates each of the response types.

4. The method according to claim 3, wherein the long response indicates a response frame with a length greater than the other response types.

5. The method according to claim 1, wherein the first field is included in a signal (SIG) field of the feedback trigger frame.

6. The method according to claim 1, wherein the feedback trigger frame is a null data packet (NDP) or NDP beamforming report Poll frame for sounding.

7. The method according to claim 1, wherein the feedback frame comprises channel state information (CSI).

8. The method according to claim 1, wherein the response STA is an STA that estimates a channel according to a sounding request by the request STA.

9. The method according to claim 1, wherein the request STA is an AP and the response STA is a non-AP STA.

10. The method according to claim 1, wherein the feedback trigger frame is transmitted after a short inter-frame space (SIFS) interval after an NDP announcement (NDPA) frame is transmitted from the request STA to the response STA.

11. A method for transmitting a feedback trigger frame by a request station (STA) of a wireless communication system, the method comprising:
- transmitting, to a response STA, a feedback trigger frame comprising a first field; and
- receiving, from the response STA, a response frame in response to the feedback trigger frame;
- wherein the first field indicates a response type of the response frame, and
- wherein transmission of the response frame is deferred when the first field indicates a long response,
- wherein the first field has a bit size of 2 and a first value of the first field corresponds to the response type of the long response, and the first value of the first field is a value of '11'.

12. A request station (STA) apparatus for transmitting a feedback trigger frame by a wireless communication system, the STA apparatus comprising:
- a transceiver; and
- a processor that controls the transceiver to:
- transmit, to a response STA, the feedback trigger frame comprising a first field; and
- receive, from the response STA, a response frame in response to the feedback trigger frame;
- wherein the first field indicates a response type of the response frame, and
- wherein transmission of the response frame is deferred when the first field indicates a long response,
- wherein the first field has a bit size of 2 and a first value of the first field corresponds to the response type of the long response, and the first value of the first field is a value of '11'.

13. A response station (STA) apparatus for receiving a feedback trigger frame of a wireless communication system, the STA apparatus comprising:
- a transceiver; and
- a processor that controls the transceiver to:
- receive, from a request STA, the feedback trigger frame comprising a first field; and
- transmit, to the request STA, a response frame in response to the feedback trigger frame;
- wherein the first field indicates a response type of the response frame, and
- wherein transmission of the response frame is deferred when the first field indicates a long response,
- wherein the first field has a bit size of 2 and a first value of the first field corresponds to the response type of the long response, and the first value of the first field is a value of '11'.

* * * * *